US011083184B1

(12) United States Patent
Kinkead et al.

(10) Patent No.: US 11,083,184 B1
(45) Date of Patent: Aug. 10, 2021

(54) WALK BEHIND APPLICATOR AND A TRANSPORT HOLD DOWN

(71) Applicant: Turfco Manufacturing, Inc., Blaine, MN (US)

(72) Inventors: George B. Kinkead, Mendota Heights, MN (US); Nicholas Oeding, Shoreview, MN (US)

(73) Assignee: Turfco Manufacturing, Inc., Blaine, MN (US)

( * ) Notice: Subject to any disclaimer, the term of this patent is extended or adjusted under 35 U.S.C. 154(b) by 105 days.

(21) Appl. No.: 16/286,876

(22) Filed: Feb. 27, 2019

Related U.S. Application Data

(60) Provisional application No. 62/636,531, filed on Feb. 28, 2018, provisional application No. 62/661,678, filed on Apr. 24, 2018.

(51) Int. Cl.
*A01M 7/00* (2006.01)

(52) U.S. Cl.
CPC .......... *A01M 7/0039* (2013.01); *A01M 7/006* (2013.01); *A01M 7/0085* (2013.01); *A01M 7/0089* (2013.01)

(58) Field of Classification Search
CPC .. A01M 7/0039; A01M 7/006; A01M 7/0085; A01M 7/0089; A01C 17/005; E01C 19/12; E01C 19/17; E01C 19/176; E01C 19/20; E01C 19/201; E01C 19/203; E01C 19/204; E01H 10/007
See application file for complete search history.

(56) References Cited

U.S. PATENT DOCUMENTS

| 1,986,134 | A | 1/1935 | Burrows et al. |
| 2,242,453 | A | 5/1941 | Cochran |
| 2,580,145 | A | 12/1951 | White ............................. 299/30 |
| 2,883,115 | A | 4/1959 | Converse ...................... 239/172 |
| 2,927,667 | A | 3/1960 | Herrmann |
| 2,955,835 | A | 10/1960 | Chouinard |

(Continued)

OTHER PUBLICATIONS

Spyker The Spreader People, brochure for model: 288 Thunderbird motorized spreader, 9 pages, 2006.

(Continued)

*Primary Examiner* — Steven M Cernoch
(74) *Attorney, Agent, or Firm* — Alan D. Kamrath; Mayer & Williams PC

(57) ABSTRACT

An applicator includes a spinner rotated by the parking brake output shaft of a hydrostatic transaxle driving first and second drive wheels. Material delivered from a hopper on the spinner is spread by the spinner rotating at a speed corresponding to the rotating speed of the drive wheels. Liquid is sprayed by either a trim nozzle intermediate sides of the frame or broadcast nozzles adjacent the sides of the frame. A spray lever is pivoted to slide a slide linkage from an upper position to a lower position abutting with a biased actuator of an on/off valve, with the spray lever and a spinner gate opening lever operable at the same time with just one hand. During transport, a front bumper is received in a horizontal leg of an L-shaped slot and a cutout in an arm pivotably mounted to a stop in which the L-shaped slot is located and in a locking position. A locking pin is inserted through apertures in the arm and the stop in the locking position.

20 Claims, 7 Drawing Sheets

(56) References Cited

U.S. PATENT DOCUMENTS

| | | | |
|---|---|---|---|
| 3,232,626 A | 2/1966 | Polzin | |
| 3,313,174 A | 4/1967 | Walker et al. | |
| 3,485,314 A | 12/1969 | Herr | |
| 3,586,246 A | 6/1971 | Van Der Lely | 239/665 |
| 3,792,814 A | 2/1974 | Platz | 239/149 |
| 3,898,891 A | 8/1975 | Colloton | 74/474 |
| 3,913,837 A | 10/1975 | Grant | 239/198 |
| 3,987,964 A | 10/1976 | Pittman et al. | 239/169 |
| 4,083,495 A | 4/1978 | Sharp | 239/287 |
| 4,271,617 A | 6/1981 | Yoshizawa | 37/195 |
| 4,352,463 A | 10/1982 | Baker | 239/663 |
| 4,538,695 A | 9/1985 | Bradt | |
| 4,620,575 A | 11/1986 | Cuba et al. | 180/307 |
| 4,681,265 A | 7/1987 | Brabb et al. | |
| 4,716,980 A | 1/1988 | Butler | 180/19.2 |
| 4,867,381 A | 9/1989 | Speicher | 239/665 |
| 4,878,339 A | 11/1989 | Marier et al. | 56/14.7 |
| 5,199,196 A | 4/1993 | Straley | 37/442 |
| 5,333,795 A * | 8/1994 | Jessen | A01C 15/02 239/157 |
| 5,653,466 A | 8/1997 | Berrios | 280/760 |
| 5,697,623 A | 12/1997 | Bermes et al. | 280/32.7 |
| 5,809,756 A | 9/1998 | Scag et al. | 56/10.8 |
| 5,810,371 A | 9/1998 | Velke | 280/32.7 |
| 5,860,604 A | 1/1999 | Kooiker | 239/684 |
| 5,882,020 A | 3/1999 | Velke | 280/32.7 |
| 5,890,867 A | 4/1999 | Hagemeyer | 414/519 |
| 5,927,730 A | 7/1999 | Sattler | 280/47.131 |
| 6,000,705 A | 12/1999 | Velke | 280/32.7 |
| 6,138,927 A | 10/2000 | Spear et al. | 239/666 |
| 6,202,779 B1 | 3/2001 | Musat | 180/170 |
| 6,234,495 B1 | 5/2001 | Velke | 280/32.7 |
| 6,336,600 B1 * | 1/2002 | Jessen | A01C 7/06 239/155 |
| 6,443,252 B1 | 9/2002 | Andes | 180/65.1 |
| 6,490,849 B1 | 12/2002 | Scag et al. | 56/16.7 |
| 6,516,596 B2 | 2/2003 | Velke et al. | 56/14.7 |
| 6,550,563 B2 | 4/2003 | Velke et al. | 180/333 |
| 6,616,074 B2 | 9/2003 | Courtney et al. | |
| 6,793,154 B2 | 9/2004 | Kost | 239/288.5 |
| 6,845,829 B2 | 1/2005 | Hafendorfer | 180/6.48 |
| 6,908,052 B1 | 6/2005 | Jacobson | 239/722 |
| 7,152,812 B1 * | 12/2006 | Johnson | A01M 7/0039 239/164 |
| 7,306,175 B1 | 12/2007 | Farmer | 239/666 |
| 7,364,169 B2 | 4/2008 | Velke et al. | 280/32.7 |
| 7,540,436 B2 | 6/2009 | Truan et al. | 239/661 |
| 8,056,828 B1 | 11/2011 | Kline et al. | 239/147 |
| 2004/0262434 A1 | 12/2004 | Buckner | 239/754 |
| 2006/0118652 A1 | 6/2006 | Hickenbottom et al. | 239/146 |
| 2008/0196374 A1 | 8/2008 | Gamble et al. | 56/14.7 |
| 2014/0131465 A1 | 5/2014 | Kline et al. | |

OTHER PUBLICATIONS

Z-Spray, on-line brochure for the Z-spray sprayers, https://www.z-spray.com/sprayers/, 2 pages.

Z-Spray, brochure for the Z-spray WB-36 walk behind spreader sprayer, 1 page.

Powerspreaders, on-line brochure for Walk Behind Spreaders, http://powerspreaders.com/index.html, 1 page.

Custom Spreaders, on-line brochure for custom spreaders, https://customspreaders.com/, 6 pages.

* cited by examiner

US 11,083,184 B1

WALK BEHIND APPLICATOR AND A TRANSPORT HOLD DOWN

BACKGROUND

A walk behind applicator and a transport hold down are shown and described.

Larger riding applicators exist, however, many smaller residential lawns have too many tight areas to make it worthwhile to use a larger riding applicator. These smaller residential lawns currently are fertilized by pushing a push spreader over the entirety of the lawn and, then, coming back over the lawn a second time with a hose to spray weed killer. The hose has to be pulled from a hose reel on the truck which is parked on the street. This process requires the technician to go over the lawn twice, with a chance to miss weeds when going over the lawn the second time with weed killer. The fertilizer and weed killer application rates are also dependent on the speed of walking of the technician, which can vary both between different technicians and can vary as the day goes along. Also pushing a full push spreader and pulling a hose all around the lawn is labor intensive.

Thus, a need exists for a walk behind applicator designed to remedy the above issues.

SUMMARY

A walk behind applicator is provided which can apply both dry granular fertilizer and spray weed killer at the same time, requiring only one pass. It also is self-propelled, requiring the technician to only operate on/off controls for the fertilizer and weed killer, and turning the machine. The technician does not have to push the machine around the lawn. The walk behind applicator operates in a similar manner to a push spreader, and the walk behind applicator's controls are simple to use, so training technicians is easier and quicker.

In illustrated aspects, a hydrostatic transaxle mounted to a base includes a wheel shaft to which drive wheels are attached. Caster wheels are mounted to the base opposite to the hydrostatic transaxle and to a console extending at an obtuse angle to the base and terminating in handlebars. A spinner includes a spinner shaft rotatably mounted to the base and rotatably interconnected to the parking brake output shaft of the hydrostatic transaxle. Material is delivered to the spinner from a hopper and is spread by the spinner rotating at a speed corresponding to the rotating speed of the wheel shaft.

In further aspects, a liquid pump in fluid communication with a liquid supply tank is rotatably interconnected to the engine driving the hydrostatic transaxle and is in fluid communication with an on/off valve. A 3-way valve in fluid communication with the on/off valve has a first position in fluid communication with a trim nozzle mounted intermediate sides of the frame and a second position in fluid communication with two broadcast nozzles mounted adjacent the sides of the frame. In other aspects, a spray lever is pivotably mounted to the console and operable with a spinner lever at the same time and with just one hand. A slide linkage is pushed by the spray lever from an upper position to a lower position turning the on/off valve on, with the slide linkage biased from the lower position to the upper position.

A hold down is provided which is removably attachable to the front of a wheeled machine or apparatus, such as but not limited to, a walk behind applicator. Securement is easily obtained using only a single tie-down in the rear of the wheeled machine.

In illustrated aspects, a front bumper is slideably received in a second, horizontal leg of an L-shaped slot of a stop secured to a carrier and in a cutout in an arm in a locking position and pivotably mounted to the stop, with the arm locked in the locking position by a locking pin inserted through apertures in the arm and the stop. In other aspects, a mount includes a vertical portion extending from a horizontal portion and between the stop and another stop. A locking lever of a generally U-shape has an interconnection extending between the arm and another arm.

The present invention will become clearer in light of the following detailed description in connection with the drawings.

DESCRIPTION OF THE DRAWINGS

The illustrative embodiments may best be described by reference to the accompanying drawings where.

Figure 1:
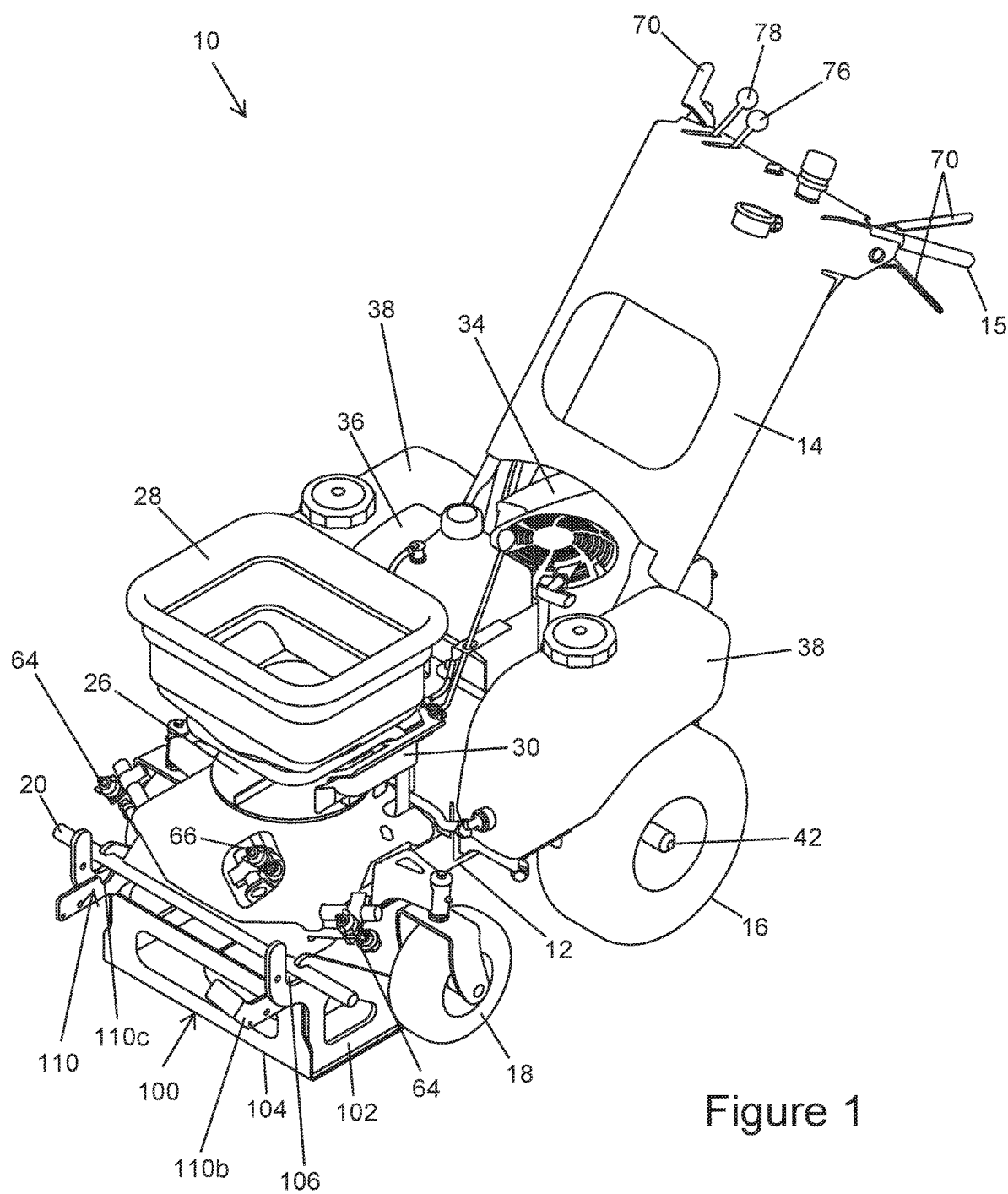
FIG. 1 shows a perspective view of a walk behind applicator.
Figure 2:
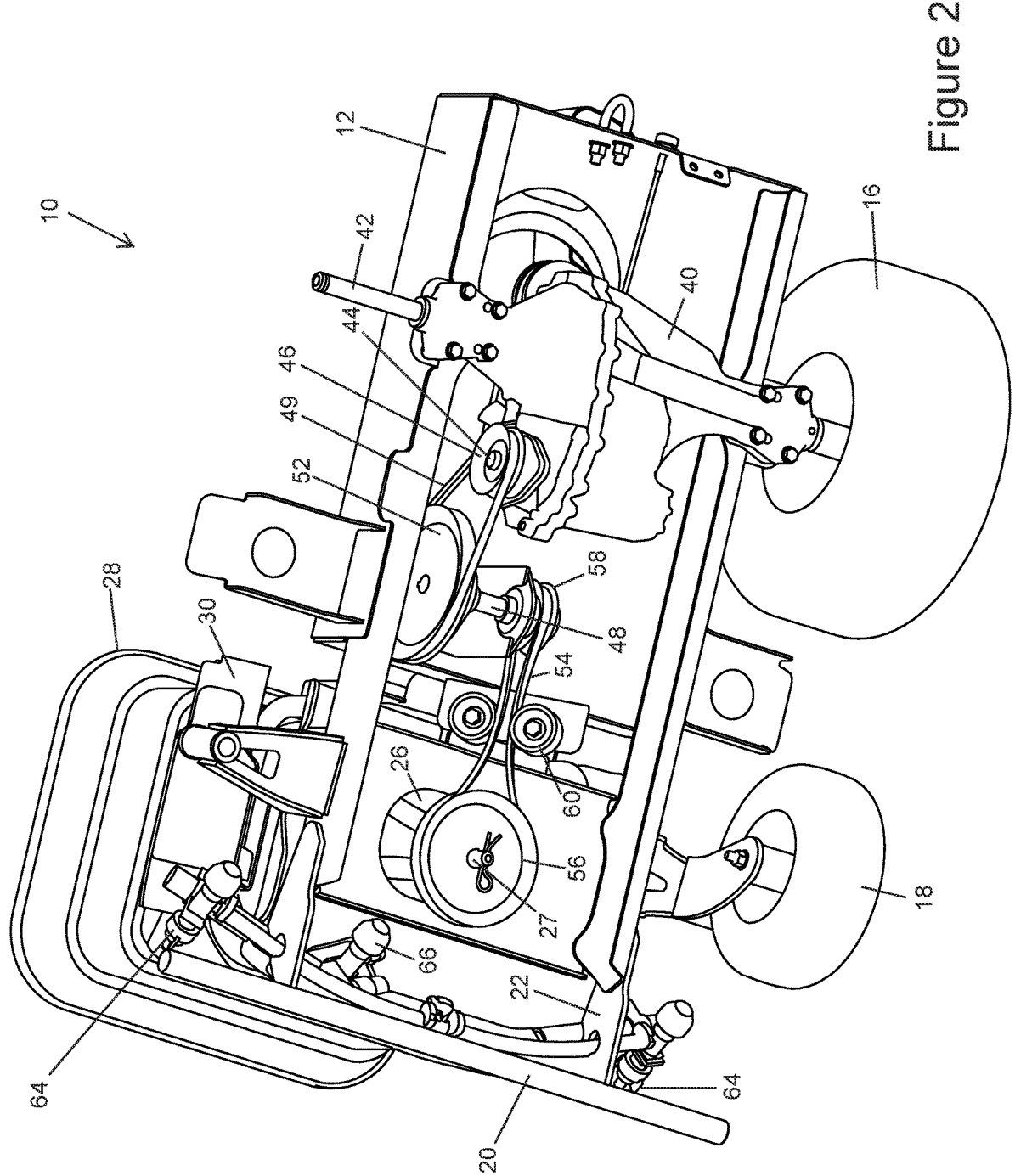
FIG. 2 shows a bottom perspective view of the walk behind applicator of FIG. 1, with portions broken away.
Figure 3:
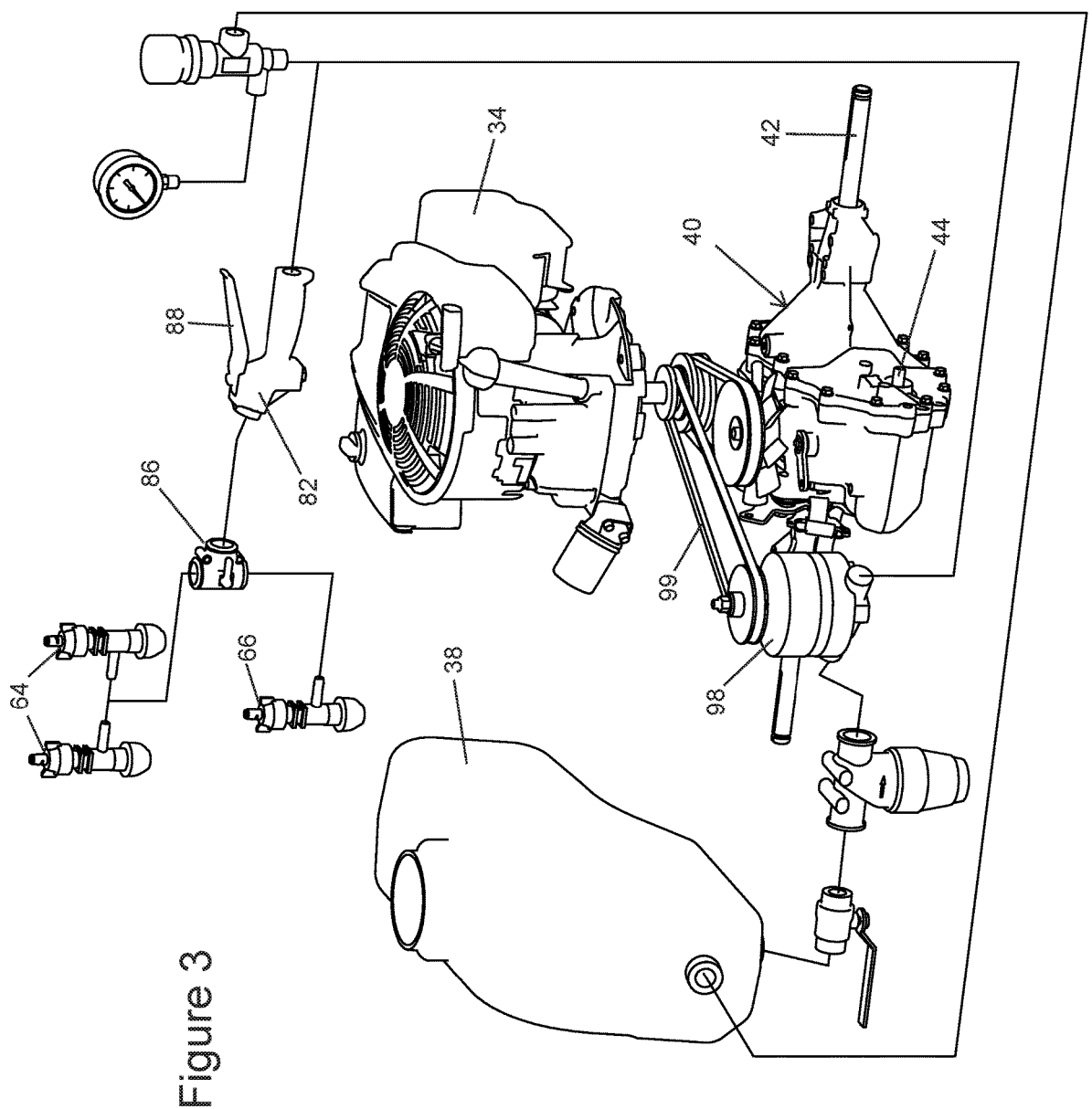
FIG. 3 shows a perspective and diagrammatic view of a fluid system of the walk behind applicator of FIG. 1.
Figure 4:
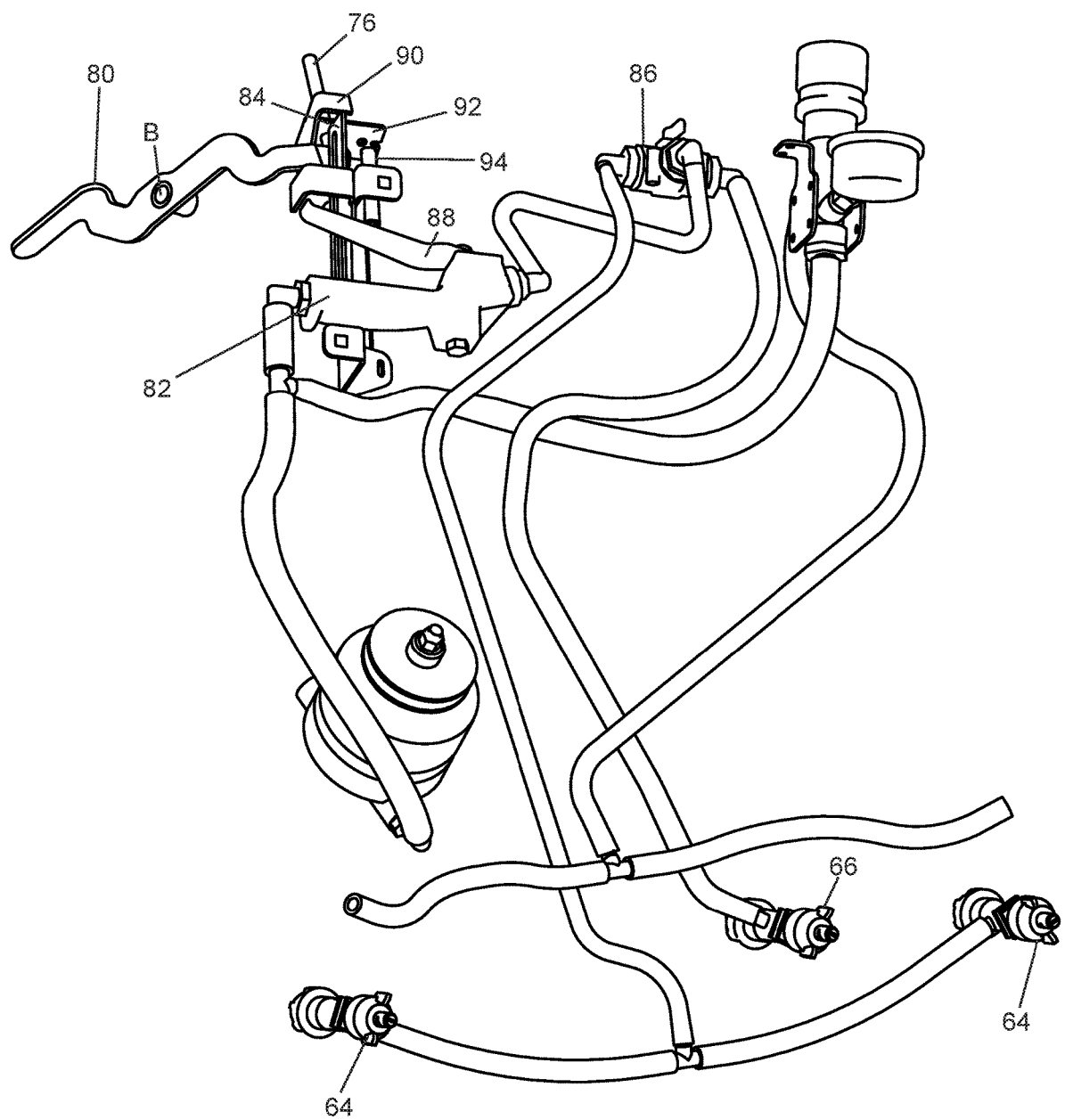
FIG. 4 shows a perspective view of a control system of the walk behind applicator of FIG. 1.
Figure 5:
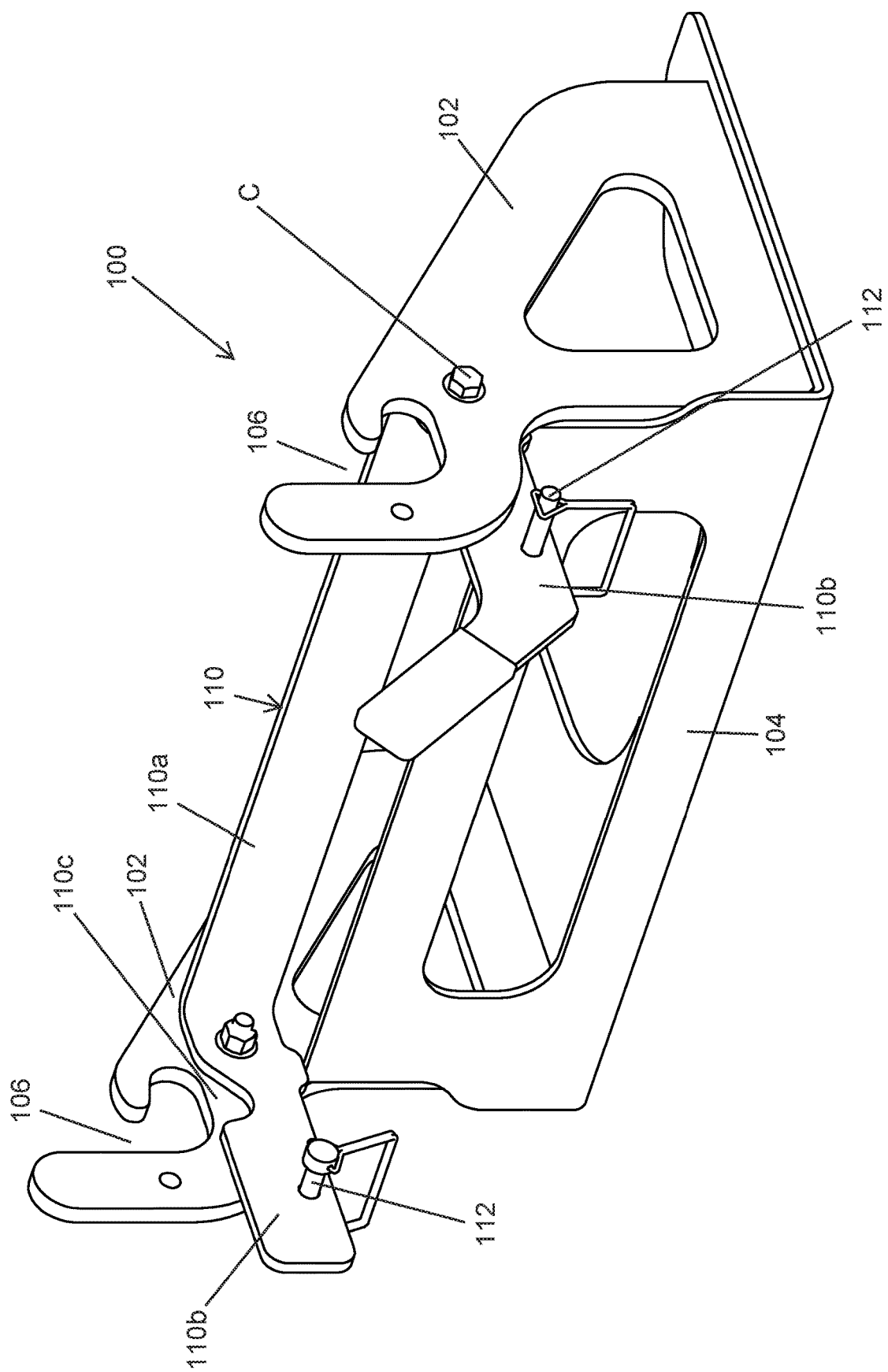
FIG. 5 shows a perspective view of a hold down which could be utilized with the walk behind applicator of FIG. 1.
Figure 6:
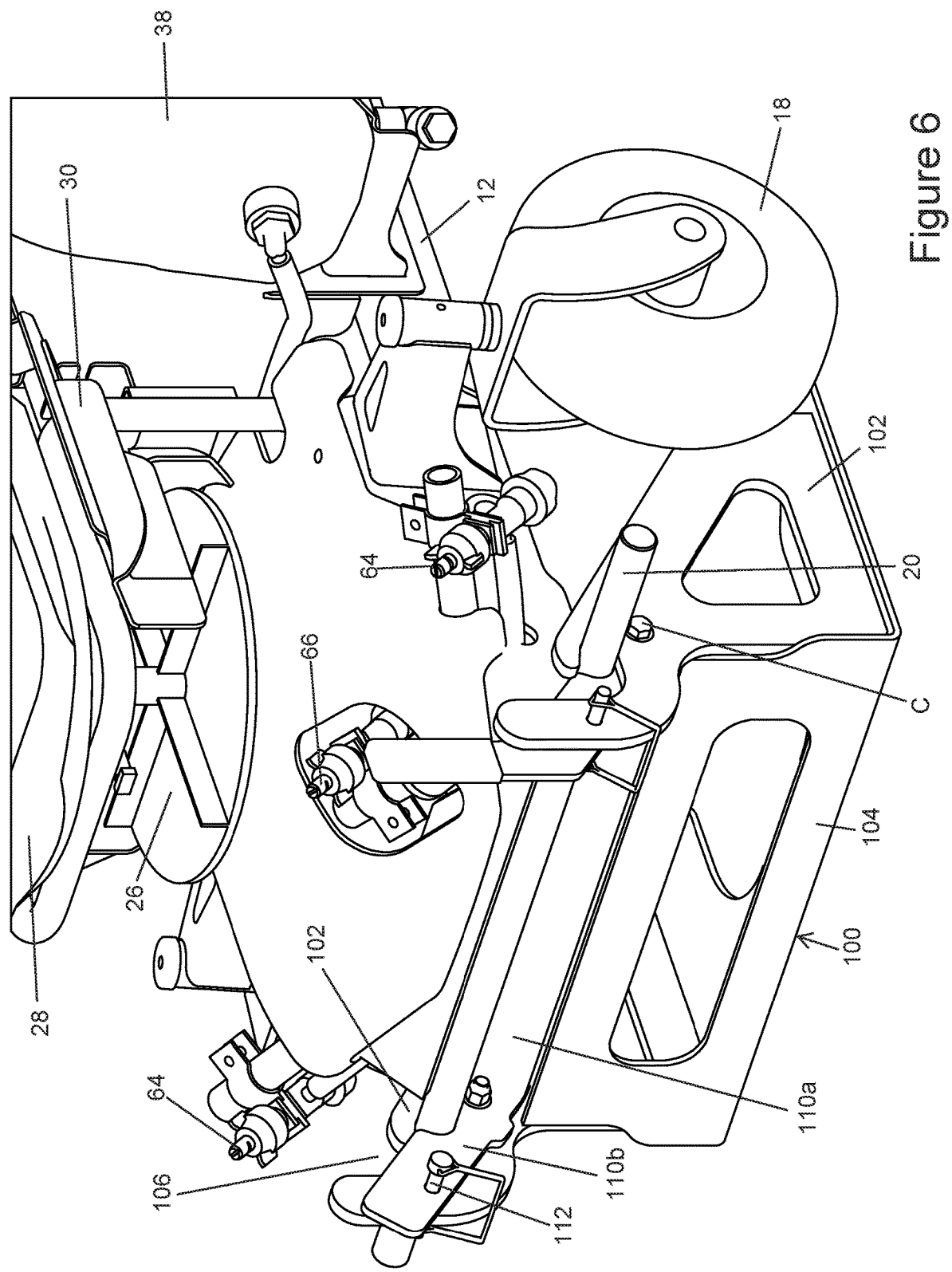
FIG. 6 shows a perspective view of the hold down in use with the walk behind applicator of FIG. 1.
Figure 7:
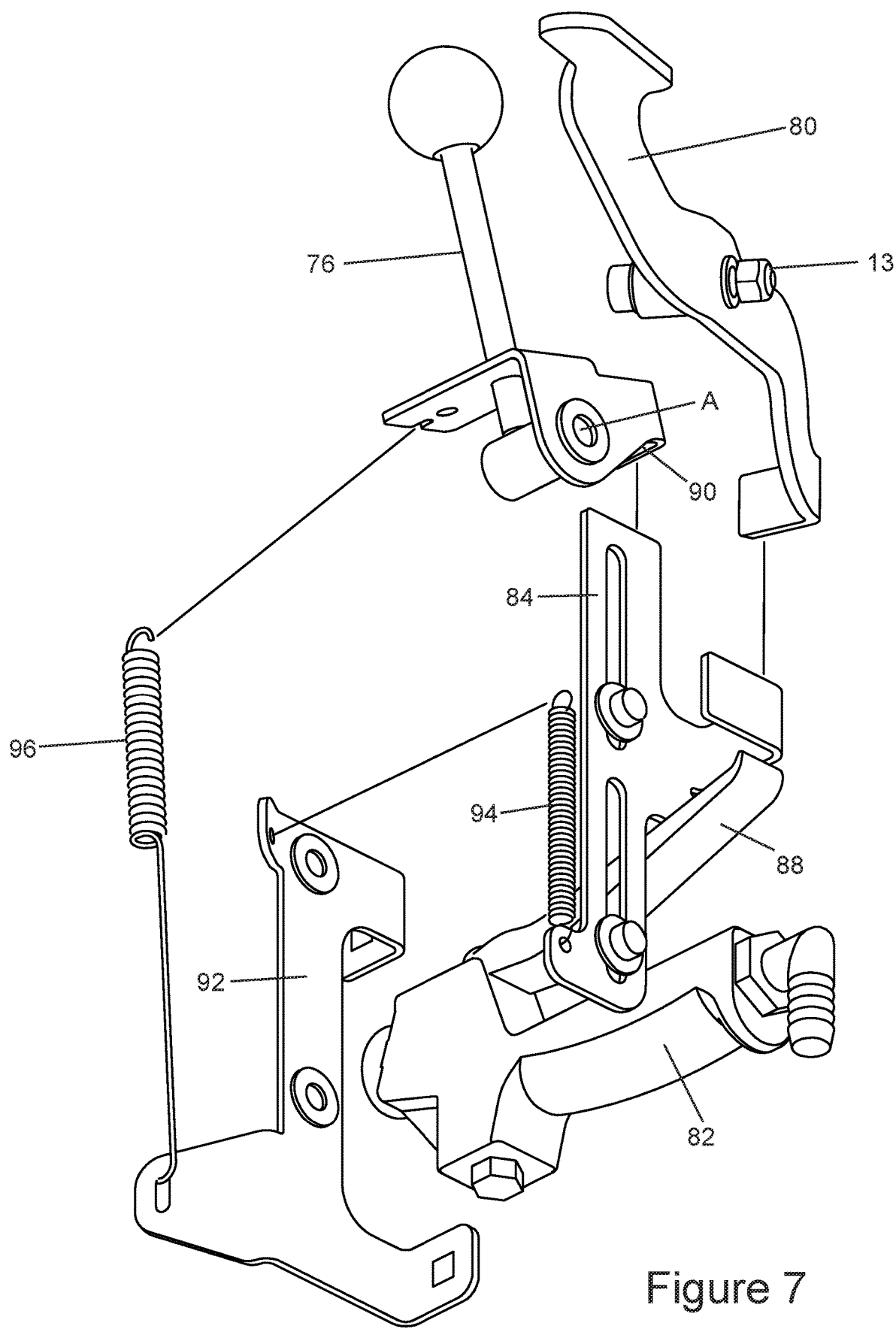
FIG. 7 shows an exploded perspective view of the control system of the walk behind applicator of FIG. 4.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

A walk behind applicator is shown in the drawings and generally designated 10. Generally, applicator 10 includes a frame including a base 12 and a console 14 extending at an obtuse angle to base 12 and terminating in a pair of handlebars 15. Base 12 is movably supported on a lawn by rear drive wheels 16 and front caster wheels 18 opposite to console 14 and drive wheels 16, with drive wheels 16 and caster wheels 18 providing mobility of the frame on a surface. The frame further includes a front bumper 20 held in a spaced relation to base 12 by spaced, parallel brackets 22 extending between front bumper 20 and base 12. Brackets 22 are located intermediate and spaced from the ends of front bumper 20. In the form shown, front bumper 20 has circular cross sections of a constant size between the ends of front bumper 20.

Applicator 10 further includes a spinner 26 having a spinner shaft 27 rotatably mounted to base 12 and perpendicular to base 12 and the surface. A hopper 28 is mounted to base 12 above spinner 26 for delivering material, such as fertilizer, to spinner 26. A trim deflector 30 is movably mounted to hopper 28 for closing half of a spreader gate to provide a correct applicator rate of the material stored in hopper 28. An engine 34 is mounted to base 12 intermediate hopper 28 and handle 14. A fuel tank 36 is mounted to base 12 intermediate hopper 28 and engine 34, and supply tanks 38 are mounted to base 12 on opposite sides of engine 34 and fuel tank 36.

Applicator 10 includes a hydrostatic transaxle 40 mounted to base 12 opposite to first caster wheels 18 and having a wheel shaft 42 to which drive wheels 16 are rotatably fixed. An input shaft of hydrostatic transaxle 40 is powered by engine 34. Hydrostatic transaxle 40 includes a parking brake output shaft 44 including an output pulley 46 and extending parallel to and spaced from wheel shaft 42. Output shaft 44 is rotatably related to shaft 27 of spinner 26. In the form illustrated, an idler shaft 48 is rotatably mounted to base 12 generally parallel to and spaced from axle 42 and generally perpendicular to and spaced from shaft 27 of spinner 26. A belt 49 extends between pulley 46 and an idler pulley 52 on one end of idler shaft 48, with a diameter of pulley 52 being substantially larger than that of pulley 46. A belt 54 extends between a spinner pulley 56 on shaft 27 of spinner 26 and an idler pulley 58 on another end of idler shaft 48. A diameter of pulley 58 is substantially smaller than that of pulley 56 and pulley 52. Tightner pulleys 60 are mounted to base 12 on opposite sides of belt 54 to tension belt 54 and direct belt 54 between pulleys 56 and 58.

Spinner 26 is powered by parking brake output shaft 44 of hydrostatic transaxle 40. Since it is not a riding unit, applicator 10 does not need a parking brake. The parking brake is removed and replaced with pulley 46 that operates spinner 26. Parking brake output shaft 44 runs on a gear ratio to wheel shaft 42 of hydrostatic transaxle 40, so spinner 26 spins faster as drive wheels 16 go faster, so spinner 26 stops as drive wheels 16 are in neutral, and so spinner 26 reverses direction as drive wheels 16 go in reverse. This is important for three reasons. One is it allows the technician to control the spread width of the fertilizer by speeding up or slowing down applicator 10, just like a push spreader, which is particularly important in tight areas. Two is it makes training new technicians easier, as most technicians have previously been trained on a push spreader. Three is designing variable speed into a v-belt drive system with a fixed input speed (engine) which requires items such as variable sheaves or other more complicated control systems is avoided.

Applicator 10 is propelled by hydrostatic transaxle 40. This is important for multiple reasons. One is it has smooth operation from forward to reverse, making getting in and out of tight areas easier. Two is it has an integrated differential in hydrostatic transaxle 40, which minimizes the amount of effort required by the technician to turn applicator 10. It also allows applicator 10 to have a zero turning radius if turned while not moving forward or reverse, which also helps getting in and out of tight areas. Three is it provides all the power required to propel applicator 10 in forward and reverse, so the technician does not have to push applicator 10 around the lawn. Four is the technician can run applicator 10 at a constant top speed to get consistent application of both the fertilizer and weed killer throughout the day as well as consistent application from technician to technician. Five is hydrostatic transaxle 40 can be put into freewheel mode, which allows a technician to push applicator 10 in case it runs out of gas, has a mechanical problem, etc.

Applicator 10 further includes two broadcast nozzles 64 mounted on opposite sides of base 12 and a trim nozzle 66 mounted to base 12 intermediate broadcast nozzles 64 and the opposite sides of base 12. Broadcast nozzles 64 have the same effective width as the width of spinner 26 at full forward speed. This allows applicator 10 to spread and spray at the same time covering the same area, so everything can be completed in one pass on the lawn. Trim nozzle 66 sprays just to the left of wheels 16 and 18 of applicator 10. To the right, trim nozzle 66 sprays the same distance as broadcast nozzles 64. Trim deflector 30 works in the same manner for the fertilizer. When trim deflector 20 is down, the fertilizer spreads just to the left of wheels 16 and 18 of applicator 10, and to the right, the same distance as when trim deflector 30 is up. This allows for trim passes (along curbs, flower beds, etc.) to apply to the same area, so all the trim areas of a lawn can be completed in one pass as well.

Applicator 10 goes forward by the technician pushing down on speed control levers 70, can be operated with the right hand, the left hand, or both. Since it can be operated with both hands, the technician can use both hands to both steer and control speed of applicator 10. To go full speed the technician can just push down on speed control levers 70, and they don't have to squeeze speed control levers 70 all day. If they want to feather the speed, they can squeeze the speed control levers 70 only part of the way down to handlebars 15. To go in reverse, the technician squeezes up on a bottom speed control lever 70, which is only on the left side of applicator 10.

The controls for the spreader gate of hopper 28 and/or nozzles 64 and 66 are all located on the right side of console 14, enabling the technician to operate speed controls and steering with the left hand when needing to turn nozzles 64 and 66 and spinner 26 on/off with the right hand. On/Off levers 76 and 78 for nozzles 64 and 66 and for spinner 26 are located right next to each other, so that if the technician is both spreading fertilizer and spraying weed killer across the entire lawn, both levers 76 and 78 can be operated at the same time and with just one hand motion.

On/Off lever 76 on console 14 will stay in the on position when engaged, and requires the technician to disengage to turn off. This is most useful when the whole lawn requires weed killer to be applied. Most of the time lawns do not require weed killer to be applied to the entire lawn. A spot spray lever 80 on right side handlebar 15 can be squeezed to turn on nozzles 64 and 66 when the technician encounters weeds in the lawn and will turn off as soon as the technician lets go of spot spray lever 80. Both the spot spray and on/off levers 76 and 80 operate the same on/off valve 82 via a slide linkage 84. After on/off valve 82 is a 3-way valve 86 having a first position providing fluid communication between on/off valve 82 and trim nozzle 66 and a second position providing fluid communication between on/off valve 82 and broadcast nozzles 64 and allowing the technician to select whether the weed killer will come out of two broadcast nozzles 64 or trim nozzle 66. This is important for the technician can always use the same on/off controls for the spray regardless of which nozzles 64 and 66 are being used.

In particular, slide linkage 84 is slideably mounted in a longitudinal direction to console 14. Slide linkage 84 abuts against a spring biased actuator 88 of valve 82. On/Off lever 76 is pivotally mounted about a pivot axis A fixed to console 14 and extending perpendicular to slide linkage 84. On/Off lever 76 includes an abutment 90 pivotal with on/off lever 76 about pivot axis A and abutable with slide linkage 84. Spot spray lever 80 is pivotable about a pivot axis B fixed to console 14, located intermediate its ends and extending parallel to and spaced from pivot axis A. The end of spot spray lever 80 opposite to handle bar 15 abuts with a portion of slide linkage 84 intermediate actuator 88 and abutment 90. Slide linkage 84 is slideably mounted by bolts to a bracket 92 secured to console 14, with a spring 94 connected between bracket 92 and slide linkage 84 for biasing slide linkage 84 from a lower position to an upper position. A spring 96 is connected between bracket 92 and on/off lever 76. This allows spray on/off lever 76 to be able to go over center to stay on and spot spray lever 80 to be a momentary on with only one valve 82.

A liquid pump 98 in fluid connection with supply tanks 38 is driven by engine 34 through a belt 99. Liquid pump 98 is in fluid communication with on/off valve 82 and with an adjustable pressure regulator in turn in fluid communication with supply tanks 38. Thus, when on/off lever 76 is pivoted pushing biased actuator 88 to its lower position, on/off valve 82 is turned on providing fluid flow from liquid pump 98, through on/off valve 82, through 3-way valve 86 to nozzles 64 or 66.

A hold down 100 is provided for restraining applicator 10 during transport. In particular, hold down 100 includes first and second, spaced, parallel stops 102 of a generally triangular shape. A mount 104 includes a horizontal portion through which fasteners can be extended into a suitable carrier and a vertical portion extending between and interconnected to stops 102. Stops 102 include generally L-shaped slots 106, with the vertical leg of slot 106 extending vertically and generally perpendicular to the carrier and above the horizontal leg of slot 106 extending generally parallel to the carrier. A locking lever 110 is of a generally U-shape and includes an interconnection 110a extending between first and second arms 110b. Locking lever 110 is pivotably mounted about a pivot axis C extending through arms 110b parallel to and spaced from interconnection 110a and stops 102. Each arm 110b includes a cutout 110c corresponding to and receiving bumper 20. Locking lever 110 is pivotal between an unlocked position spaced from L-shaped slots 106 and a locked position coextensive with L-shaped slots 106. Pins 112 are removably received in apertures formed in arms 110b and stops 102 when locking lever 110 is in its locked position.

Because of the increased efficiency of applicator 10 on a lawn versus pushing a push spreader and pulling a hose on the lawn, the loading and unloading time of applicator 10 became much more important. To decrease this time, hold down 100 for front bumper 20 was created. Hold down 100 is mounted to the carrier rack that is on the back of the truck. Locking lever 110 is in the down position. Applicator 10 is driven onto the carrier, with the technician centering applicator 10 with the hold down 100. Front bumper 20, mounted to base 12 opposite to hydrostatic transaxle 40 and parallel to wheel shaft 42, rides up the incline of stops 102, hits the vertical leg of L-shaped slots 106, and drops into L-shaped slots 106 down. The technician stops driving forward when front bumper 20 hits the vertical leg of L-shaped slots 106, then goes in reverse when front bumper 20 drops down. This pulls front bumper 20 into position in L-shaped slots 106. Then, locking lever 110 can be raised to the up, locking position and either pins 112 or a padlock can be used to lock locking lever 110 in position. This locks the front of applicator 10 into place. All that is required at the rear of applicator 10 is a single ratchet strap to a U bolt at the back of applicator 10. This system is much quicker than the three or four ratchet straps normally required.

Now that the basic teachings have been set forth, it should be appreciated that various modifications and combinations can be made. As examples, various features can be utilized solely and/or in other combinations. Particularly, although believed to produce synergistic results, front bumper 20 and hold down 100 can be utilized with other types and forms of machines than walk behind applicator 10.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Applicator comprising: a frame including a base and a console extending at an obtuse angle to the base; at least one handlebar, with the console terminating in the at least one handlebar; at least one caster wheel mounted to the base opposite to the console; a hydrostatic transaxle mounted to the base opposite to the at least one caster wheel, with the hydrostatic transaxle including a wheel shaft rotatably extending from the hydrostatic transaxle, a parking brake output shaft rotatably extending from the hydrostatic transaxle, and an input shaft rotatably extending from the hydrostatic transaxle; first and second drive wheels attached to the wheel shaft, with the at least one caster wheel and the first and second drive wheels providing mobility of the frame upon a surface; an engine mounted to the base and rotatably interconnected to the input shaft of the hydrostatic transaxle; a spinner having a spinner shaft rotatably connected to the base and rotatably driven by the parking brake output shaft; and a hopper mounted to the base above the spinner, with the hopper configured to deliver material to be spread upon the surface to the spinner rotating at a speed corresponding to a rotating speed of the wheel shaft.

2. The applicator of claim 1, further comprising: a liquid supply tank mounted to the base; a liquid pump in fluid communication with the liquid supply tank and rotatably interconnected to the engine; an on/off valve in fluid communication with the liquid pump providing fluid flow from the liquid pump to the on/off valve; a 3-way valve in fluid communication with the on/off valve providing fluid flow from the liquid pump through the on/off valve and to the 3-way valve; a trim nozzle mounted to the base opposite to the hydrostatic transaxle and intermediate sides of the base; and two broadcast nozzles mounted to the base opposite to the hydrostatic transaxle and adjacent the sides of the base, with the 3-way valve having a first position in fluid communication with the trim nozzle providing fluid flow from the liquid pump through the on/off valve and the 3-way valve to the trim nozzle and a second position in fluid communication with the two broadcast nozzles providing fluid flow from the liquid pump through the on/off valve and the 3-way valve to the two broadcast nozzles.

3. The applicator of claim 2, further comprising: a spray lever pivotably mounted to the console adjacent to the at least one handle bar; a slide linkage slideably mounted to the console, with the on/off valve including a biased actuator, with the slide linkage abutting with the biased actuator, with the slide linkage biased from a lower position to an upper position, with the biased actuator pushed by the slide linkage moving to the lower position turning the on/off valve on.

4. The applicator of claim 3, further comprising a spinner lever pivotably mounted to the console adjacent to the spray lever, with the spinner lever and the spray lever configured to be operable at the same time and with just one hand, with the spinner lever controlling closure of a spreader gate of the hopper.

5. The applicator of claim 1, further comprising: a liquid supply tank mounted to the base; a liquid pump in fluid communication with the liquid supply tank and rotatably interconnected to the engine; an on/off valve in fluid communication with the liquid pump; at least one nozzle in fluid communication with the on/off valve; a spray lever pivotably mounted to the console adjacent to the at least one handle bar; a slide linkage slideably mounted to the console, with the on/off valve including a biased actuator, with the slide linkage abutting with the biased actuator, with the slide linkage biased from a lower position to an upper position, with the biased actuator pushed by the slide linkage moving to the lower position turning the on/off valve on.

6. The applicator of claim 5, further comprising a spinner lever pivotably mounted to the console adjacent to the spray lever, with the spinner lever and the spray lever configured to be operable at the same time and with just one hand, with the spinner lever controlling closure of a spreader gate of the hopper.

7. The applicator of claim 5, further comprising: a front bumper mounted to the base opposite to the hydrostatic transaxle and parallel to the wheel shaft; a stop of a triangular shape, with the stop configured to be secured to a carrier configured to transport the applicator; an L-shaped slot formed in the stop having a first leg configured to extend generally perpendicular to the carrier and a second leg configured to extend generally parallel to the carrier, with the first leg extending above the second leg in a direction opposite to the carrier; and an arm pivotably mounted to the stop and including a cutout corresponding to and receiving the front bumper, with the arm pivotable between a locking position with the front bumper positioned in the second leg and the cutout and an unlocked position with the cutout spaced from the front bumper.

8. The applicator of claim 7, further comprising: apertures formed in the arm and in the stop; and a locking pin inserted through the apertures with the arm in the locked position.

9. The applicator of claim 8, further comprising: a mount having a horizontal portion configured to be secured to the carrier, a vertical portion extending from the horizontal portion and extending between and interconnected to the stop and another stop; and a locking lever of a generally U-shape and having an interconnection extending between the arm and another arm, with the other stop including an L-shaped slot, with the other arm including a cutout, with the front bumper having circular cross sections.

10. The applicator of claim 3, further comprising: a front bumper mounted to the base opposite to the hydrostatic transaxle and parallel to the wheel shaft; a stop of a triangular shape, with the stop configured to be secured to a carrier configured to transport the applicator; an L-shaped slot formed in the stop having a first leg configured to extend generally perpendicular to the carrier and a second leg configured to extend generally parallel to the carrier, with the first leg extending above the second leg in a direction opposite to the carrier; and an arm pivotably mounted to the stop and including a cutout corresponding to and receiving the front bumper, with the arm pivotable between a locking position with the front bumper positioned in the second leg and the cutout and an unlocked position with the cutout spaced from the front bumper.

11. The applicator of claim 10, further comprising: apertures formed in the arm and in the stop; and a locking pin inserted through the apertures with the arm in the locked position.

12. The applicator of claim 11, further comprising: a mount having a horizontal portion configured to be secured to the carrier, a vertical portion extending from the horizontal portion and extending between and interconnected to the stop and another stop; and a locking lever of a generally U-shape and having an interconnection extending between the arm and another arm, with the other stop including an L-shaped slot, with the other arm including a cutout, with the front bumper having circular cross sections.

13. Applicator comprising: a frame including a base and a console extending at an obtuse angle to the base; at least one handlebar, with the console terminating in the at least one handlebar; at least one caster wheel mounted to the base opposite to the console; a hydrostatic transaxle mounted to the base opposite to the at least one caster wheel, with the hydrostatic transaxle including a wheel shaft, a parking brake output shaft, and an input shaft; first and second drive wheels attached to the wheel shaft, with the at least one caster wheel and the first and second drive wheels providing mobility of the frame upon a surface; an engine mounted to the base and rotatably interconnected to the input shaft of the hydrostatic transaxle; a spinner having a spinner shaft rotatably connected to the base and rotatably mounted to the parking brake output shaft; a hopper mounted to the base above the spinner, with the hopper configured to deliver material to be spread upon the surface to the spinner rotating at a speed corresponding to a rotating speed of the wheel shaft; an idler shaft rotatably mounted to the base parallel to the wheel shaft; first and second idler pulleys mounted at opposite ends of the idler shaft, wherein the parking brake output shaft is parallel to and spaced from the wheel shaft, wherein the spinner shaft is perpendicular to the base and the surface; an output pulley mounted to the parking brake output shaft; a belt expanding between the output pulley and the first idler pulley; a spinner pulley mounted to the spinner shaft; and a belt extending between the spinner pulley and the second idler pulley, with the first idler pulley having a larger diameter than the second idler pulley and the output pulley, with the spinner pulley being larger than the second idler pulley.

14. The applicator of claim 13, further comprising: a trim deflector movably mounted to the hopper, with the hopper including a spreader gate, with the trim deflector partially closing the spreader gate.

15. Applicator comprising: a frame including a base and a console extending at an obtuse angle to the base; at least one handlebar, with the console terminating in the at least one handlebar; at least one caster wheel mounted to the base opposite to the console; a hydrostatic transaxle mounted to the base opposite to the at least one caster wheel, with the hydrostatic transaxle including a wheel shaft, a parking brake output shaft, and an input shaft; first and second drive wheels attached to the wheel shaft, with the at least one caster wheel and the first and second drive wheels providing mobility of the frame upon a surface; an engine mounted to the base and rotatably interconnected to the input shaft of the hydrostatic transaxle; a spinner having a spinner shaft rotatably connected to the base and rotatably mounted to the parking brake output shaft; a hopper mounted to the base above the spinner, with the hopper configured to deliver material to be spread upon the surface to the spinner rotating at a speed corresponding to a rotating speed of the wheel shaft; a front bumper mounted to the base opposite to the hydrostatic transaxle and parallel to the wheel shaft; a stop of a triangular shape, with the stop configured to be secured to a carrier configured to transport the applicator; an L-shaped slot formed in the stop having a first leg configured to extend generally perpendicular to the carrier and a second leg configured to extend generally parallel to the carrier, with the first leg extending above the second leg in a direction opposite to the carrier; and an arm pivotably mounted to the stop and including a cutout corresponding to and receiving the front bumper, with the arm pivotable between a locking position with the front bumper positioned in the second leg and the cutout and an unlocked position with the cutout spaced from the front bumper.

16. The applicator of claim 15, further comprising: apertures formed in the arm and in the stop; and a locking pin inserted through the apertures with the arm in the locked position.

17. The applicator of claim 16, further comprising: a mount having a horizontal portion configured to be secured to the carrier, a vertical portion extending from the horizontal portion and extending between and interconnected to the stop and another stop; and a locking lever of a generally U-shape and having an interconnection extending between the arm and another arm, with the other stop including an L-shaped slot, with the other arm including a cutout, with the front bumper having circular cross sections.

18. Transport hold down holding a wheeled apparatus to a carrier, comprising: a front bumper configured to be mounted to the wheel apparatus; a stop of a triangular shape, with the stop configured to be secured to the carrier configured to transport the applicator; an L-shaped slot formed in the stop having a first leg configured to extend generally perpendicular to the carrier and a second leg configured to extend generally parallel to the carrier, with the first leg extending above the second leg in a direction opposite to the carrier; and an arm pivotably mounted to the stop and including a cutout corresponding to and receiving the front bumper, with the arm pivotable between a locking position with the front bumper positioned in the second leg and the cutout and an unlocked position with the cutout spaced from the front bumper.

19. The transport hold down holding the wheeled apparatus to the carrier of claim 18, further comprising: apertures formed in the arm and in the stop; and a locking pin inserted through the apertures with the arm in the locked position.

20. The transport hold down holding the wheeled apparatus to the carrier of claim 19, further comprising: a mount having a horizontal portion configured to be secured to the carrier, a vertical portion extending from the horizontal portion and extending between and interconnected to the stop and another stop; and a locking lever of a generally U-shape and having an interconnection extending between the arm and another arm, with the other stop including an L-shaped slot, with the other arm including a cutout, with the front bumper having circular cross sections.

* * * * *